(12) United States Patent
Koci et al.

(10) Patent No.: US 11,639,701 B1
(45) Date of Patent: May 2, 2023

(54) GASEOUS FUEL ENGINE CONFIGURATION AND METHOD USING ALWAYS-OPEN FUEL ADMISSION PORTS

(71) Applicant: Caterpillar Inc., Peoria, IL (US)

(72) Inventors: Chad Koci, Washington, IL (US);
Bobby John, Peoria, IL (US); Naga Krishna Chaitanya Kavuri, Peoria, IL (US); Jonathan William Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/829,670

(22) Filed: Jun. 1, 2022

(51) Int. Cl.
*F02M 21/02* (2006.01)
*F02F 1/24* (2006.01)
*F02F 1/42* (2006.01)

(52) U.S. Cl.
CPC ........... *F02M 21/023* (2013.01); *F02F 1/242* (2013.01); *F02F 1/4285* (2013.01); *F02M 21/0209* (2013.01)

(58) Field of Classification Search
CPC ............. F02M 21/023; F02M 21/0209; F02M 21/0242; F02F 1/242; F02F 1/4285
See application file for complete search history.

(56) References Cited

U.S. PATENT DOCUMENTS

| | | | |
|---|---|---|---|
| 1,643,396 A | 9/1927 | Trussell | |
| 2,051,351 A | 8/1936 | Speed | |
| 5,970,944 A * | 10/1999 | Kawamura | F02B 19/02 |
| | | | 123/258 |
| 10,161,296 B2 * | 12/2018 | Schock | F02B 19/1023 |
| 10,415,512 B2 | 9/2019 | Kimura | |
| 2015/0128902 A1 * | 5/2015 | Joshi | F02D 19/0642 |
| | | | 123/304 |

FOREIGN PATENT DOCUMENTS

| | | |
|---|---|---|
| CN | 110318859 A | 10/2019 |
| JP | 4086440 | * 12/1999 |
| JP | 4742675 B2 | 8/2011 |
| JP | 4742975 B2 | 8/2011 |
| JP | 2021063448 A | 4/2021 |
| JP | 2021085382 A | 6/2021 |

* cited by examiner

*Primary Examiner* — Syed O Hasan
(74) *Attorney, Agent, or Firm* — Brannon Sowers & Cracraft PC

(57) ABSTRACT

An engine system includes an engine housing having a cylinder block and a cylinder head. An intake opening and an exhaust opening and an igniter opening are formed in a fire deck surface of the cylinder head. A plurality of always-open fuel admission ports are fluidly connected to a combustion chamber and arranged in at least one of the cylinder block or the cylinder head. The always-open fuel admission ports convey a gaseous fuel such as a gaseous hydrogen fuel, a gaseous hydrocarbon fuel, or still others, to the combustion chamber.

16 Claims, 2 Drawing Sheets

GASEOUS FUEL ENGINE CONFIGURATION AND METHOD USING ALWAYS-OPEN FUEL ADMISSION PORTS

Technical Field

The present disclosure relates generally to a gaseous fuel engine system, and more particularly to providing gaseous fuel for combustion by way of always-open fuel admission ports to a combustion chamber.

Background

Internal combustion engines are-well known and widely used throughout the world for applications ranging from electrical power generation to operation of pumps, compressors, and drive lines in a vehicle to name a few examples. Internal combustion engines traditionally employ one or more combustion chambers within a cylinder block equipped with pistons that reciprocate to exchange gases between a combustion chamber and an intake system and an exhaust system. Fuel and air are combusted in the combustion chambers to drive the pistons to rotate a crankshaft according to long-established principles.

In a typical liquid fuel configuration a liquid fuel such as gasoline or diesel is delivered into the combustion chamber by way of a fuel injector that is located and operated on the basis of the fuel type used and the desired operating cycle. Gaseous fuel engines are also well-known where a gaseous fuel, such as a gaseous hydrocarbon fuel like methane or natural gas, is combusted with air in the cylinder. Gaseous fuel engines generally employ port injection where the gaseous fuel is injected just upstream of a combustion chamber, direct injection where the fuel is directly injected into the combustion chamber, or fumigation where gaseous fuel is combined with a stream of intake air that is pressurized in a turbocharger and fed as a mixture into the combustion chamber. Various extensions and combinations of these basic strategies have been proposed over the years.

Recently, increased engineering attention has been given to the use of certain alternative gaseous fuels, including gaseous hydrogen fuel. Research engines have been proposed where some or all of a gaseous hydrocarbon fuel is replaced with gaseous hydrogen fuel. Operating engines on hydrogen has given rise to a great many new challenges, including the handling, pressurization, and delivery of gaseous hydrogen fuel as well as those relating to monitoring and controlling the combustion of the gaseous hydrogen fuel itself. Other technical differences and challenges over traditional gaseous fuel engines relate to admitting a suitable amount of gaseous hydrogen fuel while also providing a desired air-fuel ratio. One known engine configuration proposed to operate on hydrogen is set forth in co-pending U.S. application Ser. No. 17/673,517, filed Feb. 16, 2022.

Summary

In one aspect, an engine system includes an engine housing having a cylinder block, and a cylinder head attached to the cylinder block and including a fire deck. The fire deck includes a lower fire deck surface having formed therein each of an intake opening, an exhaust opening, and an igniter opening. The engine system further includes a piston movable within the cylinder block between a top-dead-center position and a bottom-dead-center position. A combustion chamber is formed by the cylinder block, the cylinder head, and the piston. A plurality of always-open fuel admission ports fluidly connected to the combustion chamber are arranged in at least one of the cylinder block or the cylinder head, and a plurality of fuel feed conduits extend through the engine housing to the plurality of always-open fuel admission ports.

In another aspect, a cylinder head includes a cylinder head casting having an upper surface, a fire deck having a lower fire deck surface, and a coolant cavity formed between the upper surface and the lower fire deck surface. A plurality of gas exchange conduits extend through the coolant cavity to a plurality of gas exchange openings in the lower fire deck surface, and an igniter opening is formed in the lower fire deck surface. The cylinder head casting further includes a plurality of always-open fuel admission ports in the lower fire deck surface.

In still another aspect, a method of operating an engine includes conveying pressurized air into a combustion chamber in an engine, and moving a piston of the engine from a bottom-dead-center position toward a top-dead-center position to increase a fluid pressure in the combustion chamber. The method further includes admitting a gaseous fuel through a plurality of always-open fuel admission ports in an engine housing of the engine into the combustion chamber, and igniting the gaseous fuel within the combustion chamber.

DETAILED DESCRIPTION

Figure 1:
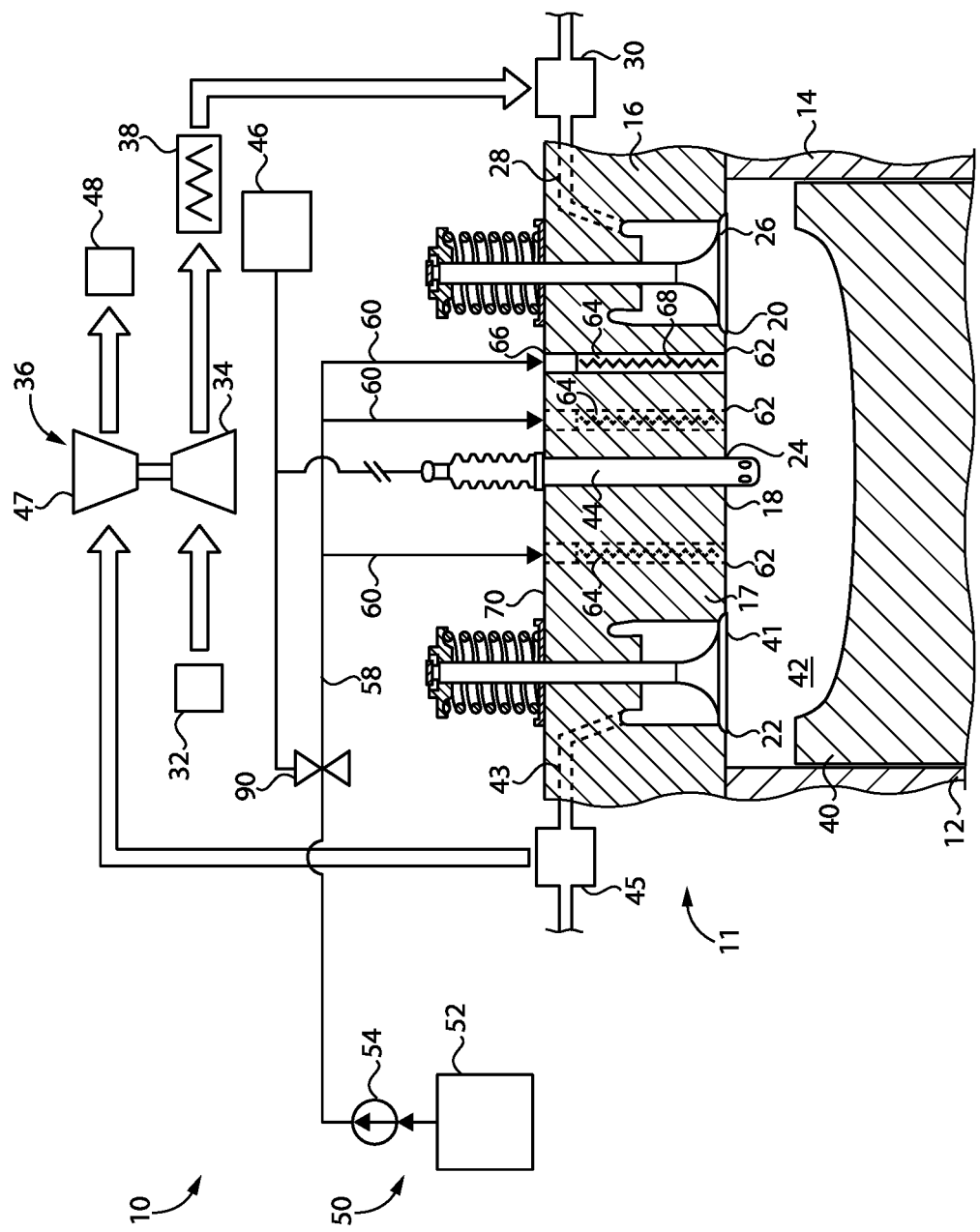
FIG. 1 is a diagrammatic view of an internal combustion engine system, according to one embodiment.

Referring to FIG. 1, there is shown a gaseous fuel internal combustion engine system 10, according to one embodiment. Engine system 10 includes an internal combustion engine 11 having an engine housing 12 including a cylinder block 14 and a cylinder head 16 attached to cylinder block 14. Cylinder head 16 includes a fire deck 17. Fire deck 17 includes a lower fire deck surface 18 having formed therein each of an intake opening 20, an exhaust opening 22, and an igniter opening 24. A piston 40 is movable within cylinder block 14 between a top-dead-center position and a bottom-dead-center position in a generally conventional manner. A combustion chamber 42 is formed by cylinder block 14, cylinder head 16, and piston 40. Combustion chamber 42 may be one of a plurality of combustion chambers in engine 11 including any number and in any suitable arrangement such as a V-pattern, an inline-pattern, or still another. Intake opening 20 may be one of two intake openings, and exhaust opening 22 may be one of two exhaust openings. An intake valve 26 is within intake opening 20 and movable to open and close fluid communication between combustion chamber 42 and an intake conduit 28. An exhaust valve 41 is within exhaust opening 22 and movable to open and close fluid communication between combustion chamber 42 and exhaust conduit 43. In a practical implementation engine 11 can be operated according to a conventional four-stroke engine cycle. Engine system 10 can be applied for any known purpose, including operation of a pump, a compressor, a drive line in a vehicle, an electrical generator, or various others. As will be further apparent from the following description, engine system 10 is uniquely configured for delivery of a gaseous fuel into combustion chamber 42 for combustion.

Engine system 10 also includes an intake manifold 30 structured to receive a feed of compressed intake air received from an air inlet 32 and compressed via a compressor 34 of a turbocharger 36 and cooled in an aftercooler 38. Engine system 10 also includes an exhaust manifold 45 receiving a feed of exhaust from combustion chamber 42 via exhaust conduit 43 and conveying the same to a turbine 47 of turbocharger 36 to be exhausted out an exhaust outlet 48. An igniter 44 is supported in igniter opening 24 and may include a spark-ignition device such as a sparkplug, a prechamber sparkplug, a prechamber ignition device supplied with an independent supply of fuel for prechamber ignition, or potentially still another type of igniter such as a liquid fuel injector for dual gaseous fuel and compression-ignition pilot fuel operation.

Engine system 10 also includes a fuel system 50. Fuel system 50 includes a fuel supply 52, at least one pump 54 structured to feed pressurized gaseous fuel to a fuel manifold 58, and a plurality of fuel feed lines 60 extending to cylinder head 16. At least one fuel valve 90 is positioned to control a flow of fuel from pump 54 to fuel manifold 58. Multiple fuel valves could be positioned one within each of fuel feed lines 60 in other embodiments for example. The at least one fuel valve 90 may be electrically actuated via a computerized electronic control unit or ECU 46. Fuel supply 52 may contain a gaseous fuel, such as gaseous molecular hydrogen, in a pressurized state. Fuel supply 52 could also contain a cryogenically stored gaseous fuel in a liquid state. Various blends of gaseous fuel including gaseous hydrogen and gaseous hydrocarbon blends could be stored in fuel supply 52 or dynamically blended in fuel system 50.

Engine system 10 also includes a plurality of always-open fuel admission ports 62 fluidly connected to combustion chamber 42 and arranged in at least one of cylinder block 14 or cylinder head 16. A plurality of fuel feed conduits 64 extend through engine housing 12 to fuel admission ports 62. The term "always open" means no valving arrangement is provided that restricts fluid communication between fuel admission ports 62 and combustion chamber 42. Engine system 10 may also include at least one check valve 66 structured to check a fluid flow through fuel feed conduits 64 in a flow direction away from combustion chamber 42. A single check valve, such as a passively operated ball check or the like, could be provided within each fuel feed conduit 64. In other instances a check valve could be positioned upstream of multiple fuel feed conduits and thereby operable to check a flow in a flow direction away from combustion chamber 42 through more than one fuel feed conduit. Fuel feed conduits 64 may be formed by passages formed by casted material of a cylinder head casting of which cylinder head 16 is formed. Fuel feed conduit 64 can thus be defined by material of the cylinder head casting, although inserted conduit pipes, tubes, or the like could also be used. Engine system 10 may also include a plurality of flame arrestors 68 positioned within fuel feed conduit 64 at locations fluidly between the respective always-open fuel admission port 62 and the at least one check valve 66. Flame arrestors 68 could include metallic inserts providing a tortuous flow path, a metallic foam, baffling, or other structures that prevent flashback or flame travel in the flow direction away from combustion chamber 42. In some embodiments, boost air could be intermittently directed through always-open fuel admission ports 62 in a flow direction toward combustion chamber 42 to purge gaseous fuel. In the illustrated embodiment, all of the plurality of always-open fuel admission ports 62 are arranged in cylinder head 16 and open in lower fire deck surface 18. In other instances some fuel admission ports could be arranged in cylinder head 16 and some in cylinder block 14. In still other instances all of a plurality of fuel admission ports could be arranged in a cylinder block or other structures of an engine housing fluidly connecting to a combustion chamber.

Figure 2:
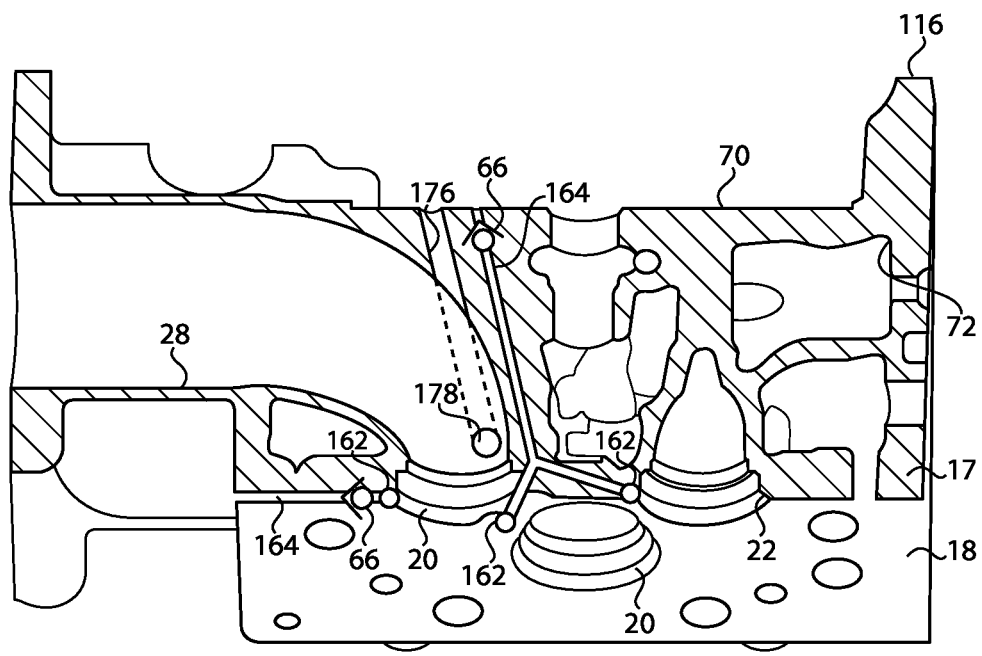
FIG. 2 is a sectioned diagrammatic view of a cylinder head, according to one embodiment.

Referring now to FIG. 2, there is shown a cylinder head/cylinder head casting 116 having similarities with cylinder head 16 discussed above. Like numerals are used in each of the Figures to denote like structures and features. Thus, cylinder head 116 includes a plurality of intake openings 20, and a plurality of exhaust openings 22, one of which is shown. An intake conduit 28 extends through cylinder head 116 between an upper surface 70 and a lower fire deck surface 18, through a coolant cavity 72 formed between upper surface 70 and lower fire deck surface 18. A plurality of always-open fuel admission ports 162 are formed in a fire deck 17 and open in a lower fire deck surface 18. One fuel feed conduit 164 (lower left side of drawing) extends downwardly from upper surface 70 and divides to fluidly connect to two always-open fuel admission ports 162. Another fuel feed conduit 164 extends laterally through cylinder head 116 to a fuel admission port 162 and is undivided. Cylinder head 116 also includes a valve back conduit 176 extending to one of the plurality of fuel admission ports 178 that opens to intake conduit 28. In an implementation, a number of the plurality of always-open fuel admission ports 62, 162, is three or greater. While there is essentially no upper limit on how many fuel admission ports could be used, in a refinement a number of always-open fuel admission ports may be from three to twelve, and in a further refinement from three to seven. As further discussed herein, provision of a valve back conduit similar to conduit 176 in combination with other conduits and fuel admission ports formed in a fire deck surface can allow varying of locations of delivery of a gaseous fuel between port-located delivery via fuel admission port 178 and a lower fire deck surface location of delivery via ports 162. Hence, a total fuel delivery amount may be distributed between or among multiple locations, by active operation of a plurality of fuel valves or based merely on the structural arrangement and locations of the various fuel admission ports. Moreover, it is contemplated that number, placement, and/or size of the several fuel admission ports can be used to control or bias fuel delivery to certain areas of a combustion chamber.

In the illustrated embodiment of FIG. 2 cylinder head 116 is shown as it might appear configured as a head section associated with a single combustion chamber. Thus, in a multi-cylinder engine a plurality of different head sections generally similar or identical to cylinder head 116 might be used, one for each combustion chamber. In other instances a so-called slab cylinder head design could be used where one cylinder head casting piece is configured for use with a plurality of individual cylinders. It is further contemplated that in certain instances an existing cylinder head for a traditional engine design can be remanufactured to produce a cylinder head according to the present disclosure, such as by drilling fuel feed conduits and fuel admission ports therein.

Figure 3:
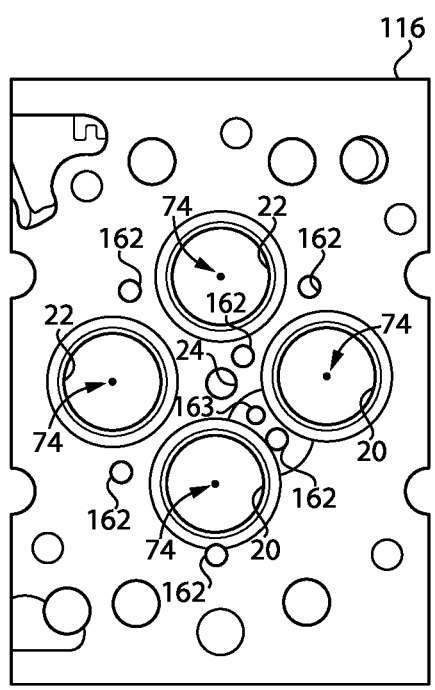
FIG. 3 is a bottom view of a cylinder head, according to one embodiment.

Referring now also to FIG. 3, there is shown a bottom view of cylinder head 116. It can be noted that two intake openings 20 and two exhaust openings 22 define center axes 74. It will also be appreciated that in the illustrated embodiment center axes 74 of the two intake openings 20 and the two exhaust openings 22 define a quadrilateral shape. The quadrilateral shape is envisioned via imaginary lines connecting center axes 74 in a square, diamond, or rectangular pattern. At least one of always-open fuel admission ports 162 may be inside the quadrilateral shape and at least one of always-open fuel admission ports 162 may be outside the quadrilateral shape. FIG. 3 also depicts igniter opening 24 roughly centered in the quadrilateral shape amongst intake openings 20 and exhaust openings 22. Another port 163 between the two intake openings 20 may receive a sensor such as a cylinder pressure sensor, or other equipment. It can also be noted from FIG. 3 that always-open fuel admission ports 162 are biased in distribution closer to the two intake openings 20 than to the two exhaust openings 22. "Biased in distribution" means that a distance between a fuel admission port and any intake opening is, on average among all the fuel admission ports, less than a distance to any exhaust opening. Biasing distribution of fuel admission ports 162 in this manner can enable taking advantage of pressurized intake air flow into the combustion chamber to assist in distributing admitted gaseous fuel. Other non-uniform distributions of always-open fuel admission ports relative to two intake openings and two exhaust openings are within the scope of the present disclosure.

Figure 4:
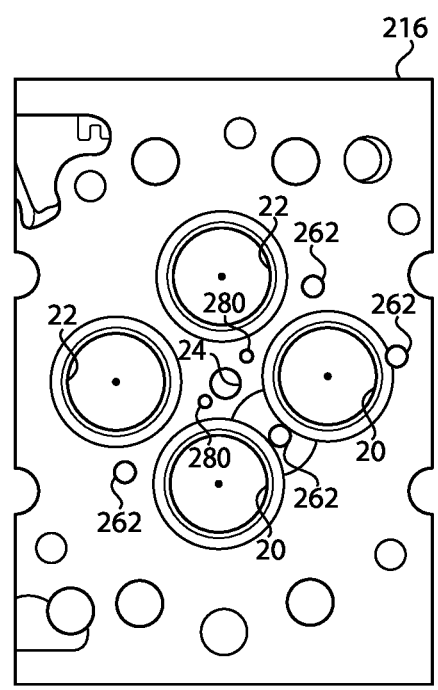
FIG. 4 is a bottom view of a cylinder head, according to another embodiment.

Turning to FIG. 4, there is shown a cylinder head 216 having similarities to other cylinder head embodiments contemplated herein, but certain differences. In FIG. 4 it can be seen that a plurality of always-open fuel admission ports 262 are all closer to intake openings 20 than to exhaust openings 22, thus biased more in distribution closer to intake openings 20 than in the case of the FIG. 3 embodiment. It can also be noted that fuel admission ports 262 have a given size, and that additional always-open fuel admission ports 280 have a smaller size. Those skilled in the art will appreciate various extensions and alterations to the embodiment of FIG. 4. Always-open fuel admission ports as disclosed herein could have a range of sizes, a distribution of sizes, and a variety of different spatial distributions to strategically deliver fuel close to an ignition source or to other locations elsewhere in a combustion chamber.

Industrial Applicability

Referring to the drawings generally, but returning focus to FIG. 1, operating engine system 10 and engine 11 can include conveying pressurized intake air into combustion chamber 42 by operating turbocharger 36 to feed the pressurized air through aftercooler 38 and to intake manifold 30 for conveyance to intake conduit 28 and any other intake conduits for other combustion chambers in engine 11. Piston 40 may be moved from a bottom-dead-center position toward a top-dead-center position to increase a fluid pressure in combustion chamber 42. Valve 90 can be moved from a closed position to an open position to permit admission of a gaseous fuel from fuel supply 52 through always-open fuel admission ports 62 into combustion chamber 42. A timing of opening valve 90 may be in a range of timings, but typically at a timing sufficient to allow pressurized gaseous fuel to flow into combustion chamber 42 during an intake stroke of piston 40 or just after an intake stroke and when piston 40 is beginning a compression stroke. At a desired ignition timing, such as at a top-dead-center position timing of piston 40, igniter 44 or another ignition device can be energized to ignite the gaseous fuel and air in combustion chamber 42, typically but not necessarily via spark-ignition. It will generally be desirable to pressurize the gaseous fuel sufficiently that the gaseous fuel will flow into combustion chamber 42 when intake valve 26 is open. Accordingly, it is generally desirable for the fuel pressure to be greater than the boost pressure of the pressurized intake air.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine system comprising: an engine housing including a cylinder block, and a cylinder head attached to the cylinder block and including a fire deck, and the fire deck including a lower fire deck surface having formed therein each of an intake opening, an exhaust opening, and an igniter opening; a piston movable within the cylinder block between a top-dead-center position and a bottom-dead-center position; a combustion chamber formed by the cylinder block, the cylinder head, and the piston; a plurality of always-open fuel admission ports fluidly connected to the combustion chamber and arranged in the cylinder head, the plurality of always-open hydrogen fuel admission ports opening in the lower fire deck surface; and a plurality of fuel feed conduits extending through the cylinder head to the plurality of always-open hydrogen fuel admission ports.

2. The engine system of claim 1 further comprising at least one check valve structured to check a fluid flow through the plurality of fuel feed conduits in a flow direction away from the combustion chamber.

3. The engine system of claim 2 further comprising a plurality of flame arrestors positioned within the plurality of fuel feed conduits at locations fluidly between the respective always-open hydrogen fuel admission port and the at least one check valve.

4. The engine system of claim 1 wherein: the intake opening is one of two intake openings and the exhaust opening is one of two exhaust openings; and the plurality of always-open hydrogen fuel admission ports have a non-uniform distribution relative to the two intake openings and the two exhaust openings.

5. The engine system of claim 4 wherein the plurality of always-open hydrogen fuel admission ports are biased in distribution closer to the two intake openings than to the two exhaust openings.

6. The engine system of claim 5 wherein center axes of each of the two intake openings and the two exhaust openings define a quadrilateral shape, at least one of the plurality of always-open hydrogen fuel admission ports is inside the quadrilateral shape and at least one of the plurality of always-open hydrogen fuel admission ports is outside the quadrilateral shape.

7. The engine system of claim 1 wherein a number of the plurality of always-open hydrogen fuel admission ports is three or greater.

8. The engine system of claim 1 further comprising an intake conduit extending through the cylinder head to the intake opening, and an always-open hydrogen fuel admission port opening to the intake conduit, and the plurality of fuel feed conduits includes a valve back conduit extending to the one of the plurality of always-open fuel admission ports opening to the intake conduit.

9. The engine system of claim 1 further comprising a gaseous fuel supply connected to the plurality of fuel feed conduits, at least one pump located fluidly between the gaseous fuel supply and the plurality of fuel feed conduits, and a spark ignition device supported in the igniter opening.

10. A cylinder head comprising: a cylinder head casting including an upper surface, a fire deck having a lower fire deck surface, a coolant cavity formed between the upper surface and the lower fire deck surface, a plurality of gas exchange conduits extending through the coolant cavity to a plurality of gas exchange openings in the lower fire deck surface, and an igniter opening in the lower fire deck surface; and the cylinder head casting further including a plurality of always-open hydrogen fuel admission ports in the lower fire deck surface, and a plurality of fuel feed conduits each extending through the cylinder head casting to one of the plurality of always-open hydrogen fuel admission ports.

11. The cylinder head of claim 10 wherein the cylinder head casting further includes an always-open fuel admission port fluidly connected to one of the plurality of gas exchange conduits.

12. The cylinder head of claim 10 further comprising at least one check valve structured to check a fluid flow through the plurality of fuel feed conduits, and a plurality of flame arrestors each positioned within one of the plurality of fuel feed conduits at a location fluidly between the respective one of the plurality of always-open hydrogen fuel admission ports and the at least one check valve.

13. The cylinder head of claim 10 wherein: the plurality of gas exchange openings includes two intake openings and two exhaust openings; the plurality of always-open fuel admission ports are biased in distribution closer to the two intake openings than to the two exhaust openings; and center axes of each of the two intake openings and the two exhaust openings define a quadrilateral shape, at least one of the plurality of always-open hydrogen fuel admission ports is inside the quadrilateral shape and at least one of the plurality of always-open fuel admission ports is outside the quadrilateral shape.

14. A method of operating an engine comprising: conveying pressurized air into a combustion chamber in an engine; moving a piston of the engine from a bottom-dead-center position toward a top-dead-center-position to increase a fluid pressure in the combustion chamber; admitting a gaseous hydrogen fuel through a plurality of always-open fuel admission ports in a lower deck surface of a cylinder head of the engine into the combustion chamber; a plurality of fuel feed conduits extending through the cylinder head to the plurality of always-open hydrogen fuel admission ports; and igniting the gaseous hydrogen fuel within the combustion chamber.

15. The method of claim 14 wherein the always-open fuel admission ports are biased in distribution closer to intake openings than to exhaust openings in the cylinder head.

16. The method of claim 14 further comprising distributing an amount of the admitted gaseous hydrogen fuel between the always-open fuel admission ports in a fire deck and an always-open fuel admission port in an intake conduit of the cylinder head.

* * * * *